Feb. 21, 1933.  E. O. KIEFFER  1,898,489
ELECTRICAL APPARATUS
Filed Oct. 8, 1930

Inventor
Emil Otto Kieffer
by Knight Bros
Attorneys

Patented Feb. 21, 1933

1,898,489

UNITED STATES PATENT OFFICE

EMIL OTTO KIEFFER, OF BERLIN-SCHLACHTENSEE, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ELECTRICAL APPARATUS

Application filed October 8, 1930, Serial No. 487,269, and in Germany October 11, 1929.

My invention relates to electrical apparatus and more particularly to a method for building up of a machine from stackings of laminations.

In electric machines, and particularly in large welded machines, the fastening of the packets of stampings, which form the active iron of the machine causes great difficulty which could hitherto only be surmounted by employing comparatively expensive constructions. Whilst in machines of comparatively short axial length, supporting members passing from one side of the machine to the other suffice to hold the laminations, it would in machines having a long axial length not be possible to avoid a bending of these supporting parts, which would cause a displacement of the laminations, with respect to one another.

The object of my invention is to provide a particularly simple method of building up such a machine by fastening together the assembled laminations and stackings of laminations used in electric machines, as a self-supporting unit, and thereby to eliminate to a great extent the said drawbacks. The method consists in assembling the stackings of laminations on clamping bars, and in drawing them together between clamping plates, to form a self-supporting, independent and completely centered armature, and in then welding this armature to ribs of the machine frame by means of intermediate pieces which engage the clamping members at a number of places, for instance, inside some of the ventilating ducts. By this means the clamping members, for instance tie-rods, are prevented from sagging under the weight of an axially long armature.

A particularly favourable manner of carrying this out is to employ round rods as supporting and clamping members for the laminations, said rods being fastened to the machine, for instance to ribs, by the means of loops.

In machines ventilated in axial direction, notches are provided for the intermediate pieces at the edge of the laminated packets, which is the farthest away from the air gap.

Figure 1:
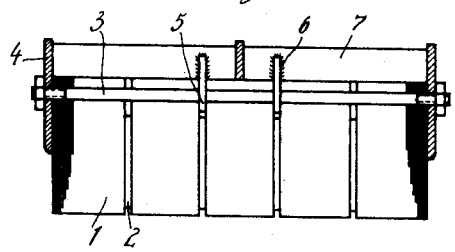
Figure 2:
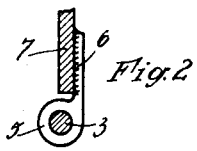
Figure 3:
Figure 6:
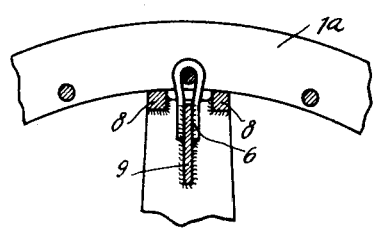
Figure 4:
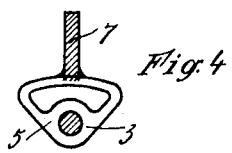
Figure 5:
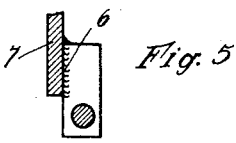
Figure 7:
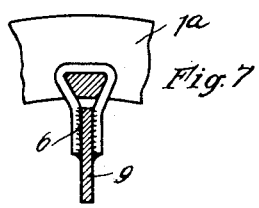

Examples embodying the invention are illustrated in the drawing affixed hereto. In this drawing:—Figure 1 shows the arrangement for the stator of an electric machine, a portion of the stator ring being shown in axial section; Figures 2 to 4 show in larger scale, and partly in section, details of the loop forms employed; Figure 5 shows in larger scale a manner of attachment by welded lugs; Figure 6 shows a portion of an electric machine rotor, partly in section, in which the laminated armature packs are attached to the rotor arms by loops; and Figure 7 shows a modification thereof.

Referring to Figure 1, 1 indicates the stackings or packs, between which ventilating ducts 2 are provided. The stackings of laminations, punchings or stampings, are clamped together between clamping plates 4 by bolts 3. In some of the ventilating ducts, loops 5 are provided of about the same thickness as the intermediate spacers, which loops engage the bolts 3 and are connected at their ends by means of welded seams 6 with ribs 7 running lengthways of the machine. The loops may have different shapes, as may be seen from the Figs. 2 to 4. They may, for instance, as in Fig. 2, be made one-sided so that they need only be welded on at one place. In that case it is of advantage to arrange the loops welded to the same rib alternately on the different sides of the rib. In some cases, it may also be advantageous to use elastic loops as shown in Fig. 4 for fastening the bolts to the ribs.

A particularly simple loop construction is obtained by employing pieces of plate into which a hole is drilled of the size of the diameter of the bolt, as shown in Fig. 5. It is in that case advisable to drill the hole somewhat unsymmetrical, i. e. off the longitudinal axis of the piece in the manner also shown in Fig. 5, as it is then possible by placing the piece of plate on the other way to compensate possible inaccuracies in the welding on of the ribs 7.

Further, an example for applying the method to a rotor of an electric machine is given in Fig. 6. There the loops engage the bolts immediately at the arm ends of the rotor, and the stackings of laminations 1ª rest directly upon transverse strips or bars 8, the outer surface of which is turned to an approximately circular form, while the loop ends are fastened to bars 9 extending in axial direction of the rotor between adjacent arms, to which they may be welded. The assembling of a machine of that kind is particularly simple, if the holes for the bolts in the clamping plates are drilled in such a manner as to be accurately centered, and the laminations are then stacked successively on the bolts and pressed between the clamping plates, so that, owing to the accurate centering, the position of the laminations, clamping plates and bolts with respect to one another is quite exact. When the loops placed upon the bolts are thereupon welded to bars 9 of the machine after the stackings are clamped together by the bolts, an arrangement is obtained having all the fastening means at the proper places.

The application of the invention is not restricted to the illustrated constructions. It is particularly not necessary for the number of loops to correspond to the number of ventilating ducts. There may also be further tie-bolts, not connected with the frame of the machine, between the loops secured to the bolts. The tie-bolts may also be passed through semi-open slot-shaped holes at the edge of the stackings of laminations. The new fastening arrangement also permits of the use of entirely closed holes for the bolts. An essential advantage of the new fastening arrangement resides in the possibility, in spite of the welded connections, of removing individual parts of the machine in a very simple manner. Instead of round bolts, other fastening means, such as dovetailed bars or the like may be used, which in this case, as shown in Fig. 7, are also tightly held by loops passed through the ventilating slots.

I claim as my invention:

1. A dynamo electric machine having a laminated armature, consisting of a self-supporting centered body composed of individual lamina and having radial ventilated ducts spaced along the armature length between the lamina, and means for clamping said lamina together, and straps located in said ventilating ducts and engaging said clamping means and protruding beyond the armature periphery near which they are located, the protruding ends of said strips being welded to the machine frame for supporting the armature on the frame throughout its entire length.

2. A method of assembling dynamo-electric machines having vented laminated armatures, consisting in assembling the armature laminations in spaced groups on permanent clamping elements, to form a radially vented completely clamped, centered and self-supporting unit and in attaching straps within the group spaces to said clamping elements, and in welding said armature to the pertaining machine frame by said straps.

3. A method of assembling dynamo-electric machines having vented laminated armatures consisting in first assembling the armature laminations in spaced groups on clamping elements to form a radially vented completely clamped and centered self-supporting unit, and attaching during said assembly within the group spaces straps to at least some of said clamping elements, and in welding said armature to the pertaining machine frame by said straps.

4. A method of assembling dynamo-electric machines having vented laminated armatures consisting in first assembling the armature laminations in spaced groups on clamping elements to form a radially vented completely clamped and centered self-supporting unit, and attaching during said assembly within the group spaces elastic straps to at least some of said clamping elements, and in welding said armature to the pertaining machine frame by said straps.

In testimony whereof I affix my signature.

EMIL OTTO KIEFFER.